United States Patent
Halabieh

(10) Patent No.: US 6,564,170 B2
(45) Date of Patent: May 13, 2003

(54) CUSTOMIZABLE USER INTERFACES

(75) Inventor: Abdul Halabieh, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 328 days.

(21) Appl. No.: 09/751,010

(22) Filed: Dec. 29, 2000

(65) Prior Publication Data

US 2002/0087289 A1 Jul. 4, 2002

(51) Int. Cl.[7] ............................ G06F 19/00; G09G 5/00
(52) U.S. Cl. .................... 702/181; 709/224; 345/736
(58) Field of Search ........................ 702/181, 186; 709/224, 223; 345/736, 737, 738, 733

(56) References Cited

U.S. PATENT DOCUMENTS

| | | | | |
|---|---|---|---|---|
| 5,675,510 A | * | 10/1997 | Coffey et al. | 709/224 |
| 5,740,549 A | * | 4/1998 | Reilly et al. | 705/14 |
| 5,796,952 A | * | 8/1998 | Davis et al. | 709/224 |
| 5,878,384 A | * | 3/1999 | Johnson et al. | 702/187 |
| 5,892,917 A | * | 4/1999 | Myerson | 709/224 |
| 5,960,429 A | * | 9/1999 | Peercy et al. | 707/5 |
| 5,961,598 A | * | 10/1999 | Sime | 709/224 |
| 5,964,839 A | * | 10/1999 | Johnson et al. | 709/224 |
| 6,006,222 A | * | 12/1999 | Culliss | 707/5 |
| 6,014,638 A | * | 1/2000 | Burge et al. | 705/27 |
| 6,317,787 B1 | * | 11/2001 | Boyd et al. | 709/224 |
| 2002/0089532 A1 | * | 7/2002 | Cohen et al. | 345/736 |

* cited by examiner

*Primary Examiner*—Patrick Assouad

(57) ABSTRACT

The invention describes a system and method which monitors user-selected events on a monitored computing environment for customizing a responsive user interface. The system records user actions into an event log and counts the number of occurrences of each individual event and the total number of events. A processing unit then calculates a first degree probability for each event. The number of events sharing the same first degree probability are then counted and used by processing unit to calculate the second degree probability for the events. The processing unit analyzes the first and second degree probability data to determine groups of correlated user-selected events. Based on these groupings, a user interface (UI) assembler selects interface modules from a UI module database, which correspond to the events in a particular group, to assemble a user interface customized to the user's selected actions or events.

20 Claims, 2 Drawing Sheets

CUSTOMIZABLE USER INTERFACES

BACKGROUND

The Internet infrastructure includes many software monitoring and interaction applications for detecting the habits of Internet users. Some of these applications may generally modify the display or user interface attempting to provide a customized or personalized appearance and interface to each user based on the detected information. Some applications monitor user activities by placing small files, called cookies, on accessing computers, which may later be read and identified when the same user returns to a compatible web site. Other, less invasive, applications monitor the web server, sensing, storing, and analyzing user activities or user-selected events. The goal of these customizing applications is to provide a more user-friendly interface to potential customers or clients in addition to attempting to provide a sense of personal service to individuals accessing a company's web site.

Some applications also provide insight into the effectiveness of a web site's design. For example, if an on-line index has been created without a jump feature, to allow jumping directly to entries beginning with certain letters, a monitoring application may provide data showing how frequently the scrolling functions, up and down, are used to locate desired material. With this information, the web site may be upgraded to ease the user's burden of finding desired information.

Automated customizing and monitoring applications typically observe activities at a designated web server, counting the number of button or hyperlink clicks or events selected by its users. The web sponsor or the application may then determine to change the interface based on these frequency totals. For example, if it is determined that a hyperlink on the third-layer of a web site receives the highest number of clicks for any given time period, that hyperlink may be moved to the initial web page depending on its function. Furthermore, the application may calculate the top few features having the greatest number of hits or clicks and place those, as a group, onto an easily accessible web layer. However, using the frequency of clicks or events occurring at any given web site may generally lead to unreliable results.

An application that groups features by highest frequency totals for modifying a user interface must make an arbitrary choice as to which features or events to group together. The choice is arbitrary because, although the group of features or events may have the highest frequency totals out of all of the recorded events, the high overall total does not necessarily mean that there is a higher probability of a user triggering one of the events in the groupin relation to any of the others. In other words, the highest frequency totals do not necessarily mean there is a correlation between or among the grouped events.

Companies typically provide these web monitoring services to Internet businesses. A business desiring to monitor its web activity must then normally buy, not only the proprietary software of the service provider, but generally must also buy the monitoring services from the service provider. The service provider loads its software onto the business' web server and then monitors the data from a service provider location. The provider will then usually analyze the data and implement or suggest any changes to the business' user interface. Alternatively, the provider's software may also be capable of changing the user interface based on the software's analysis of the monitored data.

It would therefore be desirable to have a monitoring application that provides a statistically-based choice as to the groupings of related events or features on a web site.

It would also be desirable to have such a monitoring application available as a software product from which an Internet business could monitor and customize its own web user interface.

Another desirable factor would be to have such a software application with the capability of automatically customizing a user interface based on the statistical calculations of event probabilities.

SUMMARY OF THE INVENTION

The present invention is directed to a system and method for customizing user interfaces based on user-selected events. The system comprises an event log for tracking all user-selected events. Using the tracked events and a system processor, the system preferably calculates a first degree probability of each user-selected event occurring, and a second degree probability of the user-selected events having the same first degree probability. An analyzer looks at the second degree probability with respect to the first degree probability in order to preferably determine divisions of user-selected events having said same first degree probability. An interface assembler then preferably builds the user interface in response to the divisions of the user-selected events.

The inventive system operates through a method for customizing user interfaces in a monitored computing environment by monitoring user actions in the monitored computing environment. The system preferably calculates a first degree probability of each of the user actions and then preferably calculates a second degree probability the user actions. Groups of user actions having the same first degree probability are preferably created by analyzing the second degree probability with respect to said first degree probability. When the system receives an immediate user action, it preferably assembles the user interface responsive to the group of user actions in which the immediate user action is found. The system preferably chooses groups having the highest first degree probability where possible.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
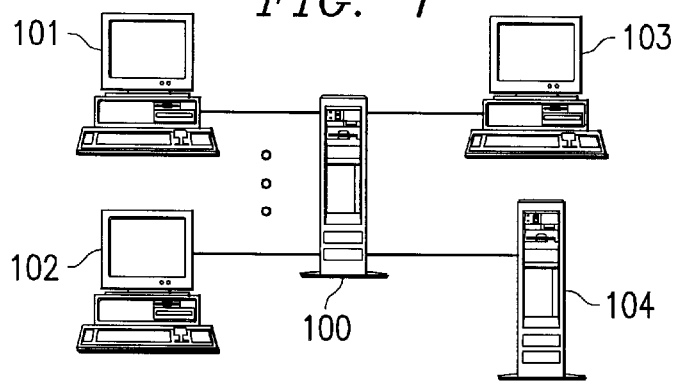
FIG. 1 is a block diagram illustrating a monitored environment for use with a preferred embodiment of the present invention.

FIG. 1 illustrates a typical monitored computer environment in which a preferred embodiment of the present invention may be implemented. Web server 100 hosts any number of accessing users including users 101 and 102, providing graphics, video, and/or data as a part of its web functionality. Users 101 and 102 may navigate around different web pages stored on web server or may hyperlink to pages stored on external servers such as server 104. Workstation 103 typically monitors the activities and events triggered by all users 101 and 102 and may generally monitor the status of the server.

In a preferred embodiment of the present invention, the customizing application may preferably reside on web server 100. The inventive application may preferably operate autonomously on web server 100 and/or may be in communication with workstation 103 to provide gathered data for human monitoring of the computer environment.

In alternative embodiments, the present invention may reside on workstation 103 or an external computer which has the communication connections to web server 100 necessary for monitoring the user activities.

Figure 2:
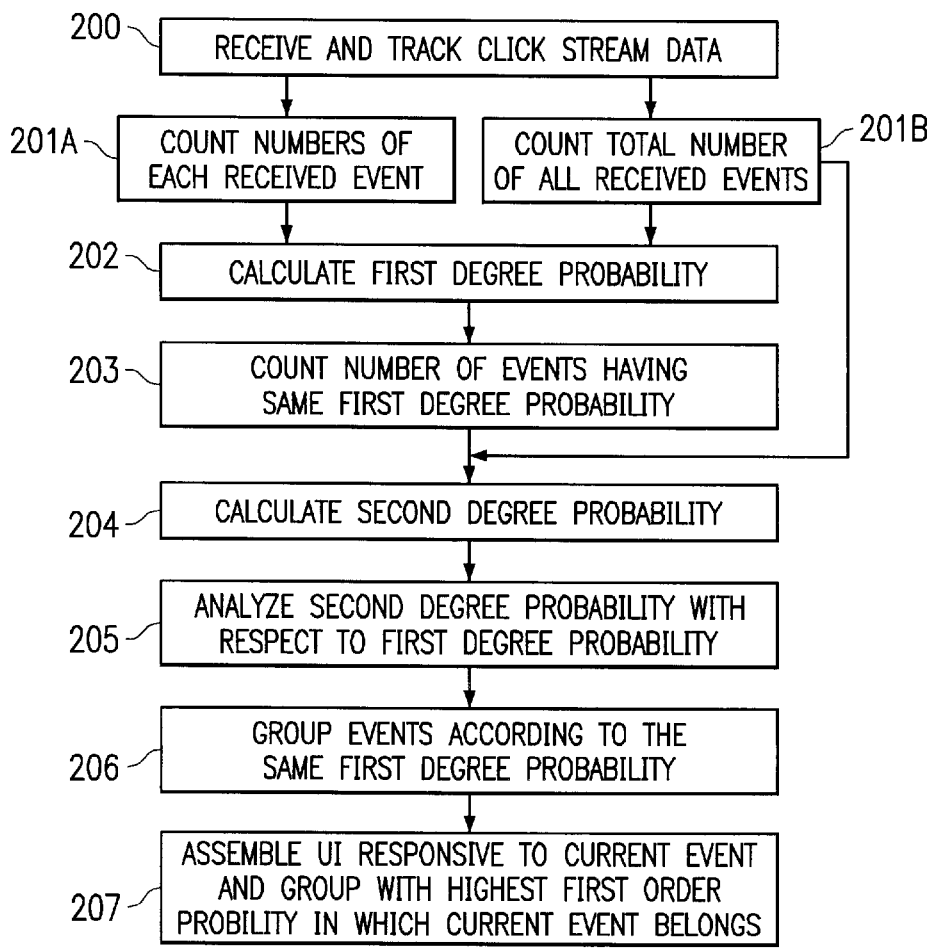
FIG. 2 is a flow chart of the steps for implementing a preferred embodiment of the present invention.

FIG. 2 is a flow chart of the functionality of a preferred embodiment of the present invention. The customization process begins at step 200 by receiving and tracking the click stream data from all users accessing the system. The system counts the frequency of each triggered event tracked at step 201A and keeps a running total of all tracked events at step 201B. Using the number of each triggered event and the total of all events, the system calculates the first degree probability for each event in step 202. The first probability, P(x), is calculated as the ratio of the number of times a single event is triggered, $i_x$, to the total number of events stored, N, according to the formula:

$$P(x) = i_x/N \quad (1)$$

Step 202 results in a probability for each event triggered over a given period of time. The system then counts the number of single events which have the same first degree probability value in step 203. The system calculates the second degree probability of each event in step 204, using the total of all tracked events again from step 201B and the number of events sharing the same first degree probability from step 203. The second degree probability, $P^2(x)$, is calculated as the ratio of the number of tracked events sharing the same first degree probability, $i_{p(x)}$, to the total number of all tracked events, N, according to the formula:

$$P^2(x) = i_{p(x)}/N \quad (2)$$

The system then analyzes the second degree probability with respect to the first degree probability in step 205. In some analyses, a graph or plot may be created with the second degree probability as the y-axis variable and the first degree probability as the x-axis variable. This graph, as the one shown in FIG. 4, produces a relationship between the events sharing the same first order probability.

In step 206, the system groups the events according to shared first degree probability values. Thus, all events in a group share the same first degree probability. The system uses these groupings in step 207 to assemble and create a customized user interface. When a user triggers an event, the system takes the current event, determines which group the event resides in, and then assembles the interface using interface modules relating to the other events in that group. The system preferably selects the group with the highest first order probability when feasible.

Figure 3:
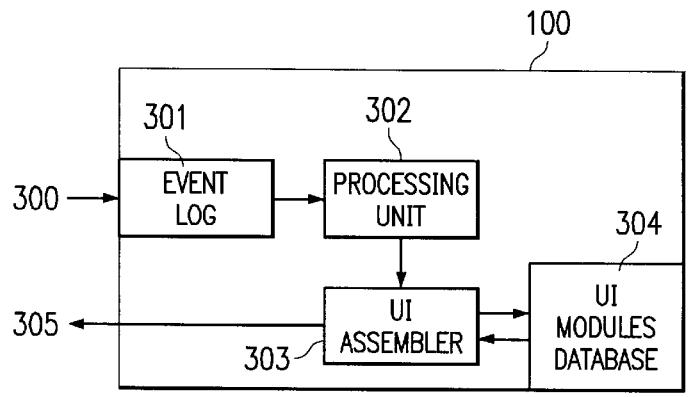
FIG. 3 is a diagram illustrating a preferred embodiment of the present invention.

FIG. 3 shows a block diagram of the components of a preferred embodiment of the present invention. The inventive system resides on web server 100. Server 100 maintains connections to accessing user through communication paths 300 and 305. Incoming data funnels into server 100 through path 300, after which the present invention may store each triggered event in event log 301. Event log 301 preferably comprises a set of counters as well as memory in order to count the total number of times each individual event is triggered. The counters also keep a running total of all of the events triggered. For example, during a web session, a user selects events x, y, and z a number of times. The counter determines that event x was selected 10 times, event y was selected 5 times, and event z was selected 10 times. The counter would typically store these numbers associated with the events selected, and would also store the total number of events triggered of 25.

Processing unit 302 preferably monitors the activities in event log 301 and performs all of the processing functions of the present invention. Processing unit 302 receives the counts of the number of times each individual event is triggered or activated and the total number of all events or user actions selected. Processing unit 302 then preferably calculates the first degree probability for each individual user-selected event or action.

After determining the first degree probabilities, processing unit 302 preferably counts the number of individual events sharing the same probability. Processing unit 302 then preferably calculates the second degree probability for the user actions or events sharing the same first degree probability. Using the first and second degree probabilities, processing unit preferably analyzes the second degree probabilities with respect to the first degree probability to determine correlations between the two data sets. While a computer is capable of analyzing the resulting raw data, a graph, such as the one shown in FIG. 4, is helpful to visualize the resulting correlations between the two probabilities.

Figure 4:
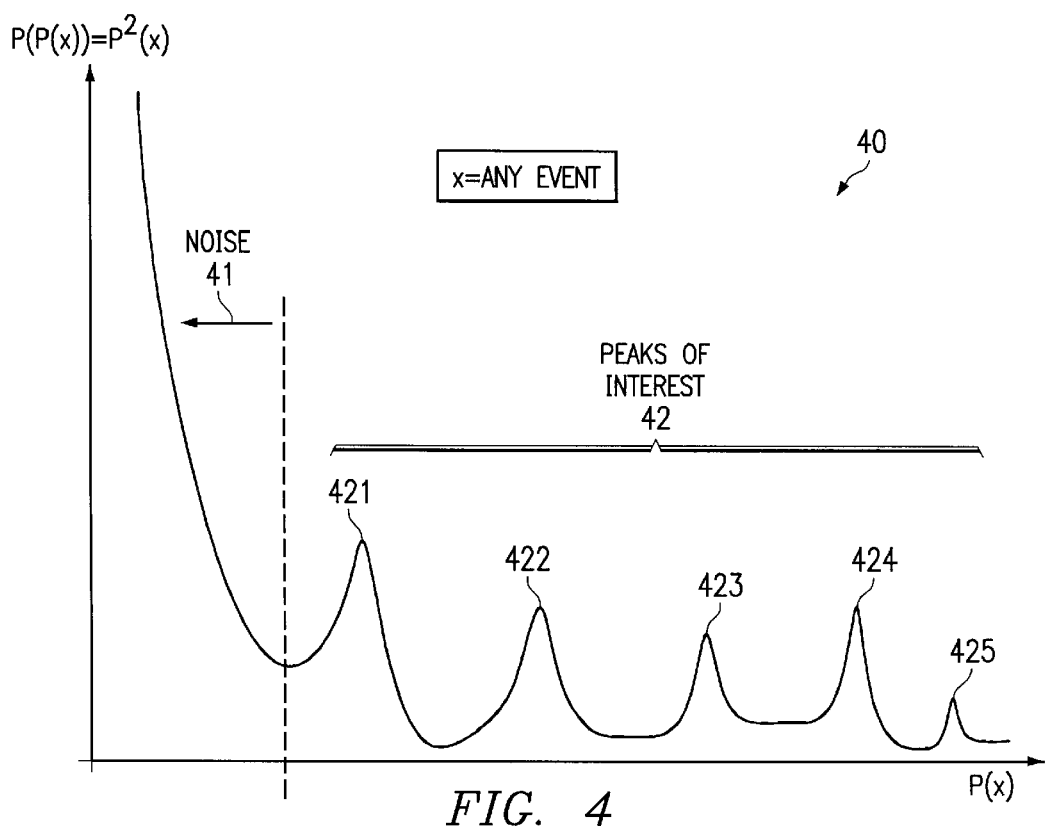
FIG. 4 is a graph illustrating the natural peaks resulting in the statistical calculations according to a preferred embodiment of the present invention.

Graph 40 in FIG. 4 shows the x-axis as the first degree probability, P(x), and the y-axis as the second degree probability, $P^2(x)$. Graph 40 illustrates the correlations between the two probability calculations. Because there are numerous random events which occur with low probability, graph 40 begins high and slopes downward rapidly. As the first degree probability increases, a number of peaks arise. These peaks represent the groupings of events which share the same first degree probability, and are therefore labeled, peaks of interest 42. Graph 40 allows for a natural dividing line between the highly random events and events having more of a correlation between their triggering. The dotted line divides graph 40 based on this principle, wherein the smallest first degree probability events are rejected as noise 41. Peaks 421 through 425 represent groupings of events which may have correlations that would preferably suggest grouping the user interface modules corresponding to those related events onto a single page. Because the first degree probability increases to the right on graph 40, the peaks having the highest first degree probabilities are more interesting with regard to correlations between the grouped events, and are therefore preferred over the higher-probability groups.

Returning again to FIG. 3, processing unit 302 analyzes the graph data and groups the events according to the shared first degree probability, or, in other words, according to their shared peaks. Processing unit 302 also monitors user-selected events as they are received in real-time by web server 100. In the preferred embodiment of the present invention, processing unit 302 receives a real-time user-selected event, it then determines the group that the real-time event is contained in. Based on the group determined by processor 302, processor 302 sends group instructions to UI Assembler 303 for building the user interface to be presented to the user who selected the event.

UI assembler 303 receives the list of events contained in the determined group and locates each corresponding interface module in UI modules database 304. UI modules database 304 contains interface modules corresponding to each possible user-selected event or action. These modules are coded in such a fashion that they can be grouped and combined in any sequence or combination. UI modules database 304 returns the appropriate interface modules corresponding the events of the determined group. UI Assembler 303 then combines the received modules into a custom user interface for presentation to the user over communication path 305.

It should be noted that communication paths 300 and 305 represent only the directional aspects of the communication session. Thus, while the preferred embodiment of the present invention may be implemented with two wires, cables, or wireless links, a single wire, cable, or wireless link may provide the two-way communication paths.

In alternative embodiments of the present invention, counters may be disposed either in the event log, the processing unit, or even as external registers resident in web server 100. The present invention is not limited to having the counters disposed only in event log 301 and processing unit 302.

Alternative embodiments of the present invention may also preferably modify event log 301 for storing only the counted numbers of events. In such alternative embodiments, the memory requirements are thus reduced considerably.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for customizing user interfaces based on user-selected events comprising:

an event log for tracking said user-selected events;
a processor for calculating:
   a first degree probability of said user-selected events occurring; and
   a second degree probability of said user-selected event, having a same first degree probability, occurring;
an analyzer for analyzing said second degree probability with respect to said first degree probability to determine divisions of said user-selected events having said same first degree probability; and
an interface assembler for assembling said user interface responsive to said divisions of said user-selected events.

2. The system of claim 1 wherein said event log tracks said user-selected events while said user accesses an application monitored by said system.

3. The system of claim 1 wherein said processor calculates said first degree probability based on a frequency of said user-selected event occurring in relation to a corresponding total of substantially all events tracked by said event log.

4. The system of claim 1 wherein said processor calculates said second degree probability based on a number of said user-selected events occurring, having said same first degree of probability, in relation to a corresponding total of substantially all user-selected events tracked by said event log.

5. The system of claim 1 further comprising:
a database of user interface modules corresponding to each potential user-selected event, wherein said interface assembler determines a combination of said modules using said user-selected events contained in said divisions.

6. The system of claim 5 wherein said interface assembler selects said combination of modules corresponding to said divisions of user-selected events having a highest first degree probability in relation to other of said divisions.

7. A method for customizing user interfaces in a monitored computing environment comprising the steps of:
monitoring user actions in said monitored computing environment;
calculating a first degree probability of each of said user actions;
calculating a second degree probability of each of said user actions;
analyzing said second degree probability with respect to said first degree probability;
determining groups of user actions having a same first degree probability using said analyzed second degree probability;
assembling said user interface responsive to an immediate user action and said group of user actions in which said immediate user action is grouped.

8. The method of claim 7 wherein said monitoring step comprises the steps of:
reading a click stream transmitted from a computer device used to access said computing environment;
counting a frequency of a single user action of said user actions; and
counting a number of substantially all monitored user actions in said monitored computing environment.

9. The method of claim 7 wherein said calculating said first degree probability comprises the step of:
calculating a ratio of said determined frequency of single user actions to said number of substantially all monitored user actions.

10. The method of claim 7 wherein said calculating said second degree probability comprises the steps of:
- determining a number of said user actions which have said same first degree probability;
- determining a number of substantially all monitored user actions in said monitored computing environment;
- calculating a ratio of said number of said user actions, having said same first degree probability, to said number of substantially all monitored user actions.

11. The method of claim 7 wherein said analyzing step comprises the step of plotting a graph of said second degree probability with respect to said first degree probability.

12. The method of claim 11 wherein said determining groups step comprises the steps of:
- reading data from said graph of said second degree probability with respect to said first degree probability; and
- grouping said user actions displayed on said graph according to said same first degree probability.

13. The method of claim 7 wherein said assembling step comprises the steps of:
- reading said immediate user action;
- determining said group into which said immediate action is grouped;
- constructing said user interface to provide said user choices for each of said user actions contained in said determined group.

14. A computer program product having a computer readable medium with computer program logic thereon for monitoring a computing environment and customizing user interfaces, said computer program product comprising:
- code for storing events selected by a user accessing said monitored computing environment;
- code for calculating a first degree probability of each of said stored events;
- code for calculating a second degree probability of each of said stored events;
- code for evaluating said second degree probability with respect to said first degree probability;
- code for selecting groups of events having a same first degree probability;
- code for building said user interface responsive to:
  - a triggering of one of said events; and
  - said group of events in which said triggered event is grouped.

15. The computer program product of claim 14 wherein said code for storing comprises:
- code for receiving a click stream transmitted from a computer device used to access said computing environment; and
- code for placing events corresponding to said received click stream into a memory.

16. The computer program product of claim 14 wherein said code for calculating said first degree probability comprises:
- code for measuring a frequency of a single event;
- code for measuring a number of substantially all stored events in said monitored computing environment; and
- code for calculating a ratio of said measured frequency of said single events to said number of substantially all stored events.

17. The computer program product of claim 14 wherein said code for calculating said second degree probability comprises:
- code for measuring a number of said events having said same first degree probability;
- code for measuring a number of substantially all recorded events in said monitored computing environment;
- code for calculating a ratio of said number of said events, having said same first degree probability, to said number of substantially all stored events.

18. The computer program product of claim 14 wherein said code for evaluating comprises code for plotting a graph of said second degree probability with respect to said first degree probability.

19. The computer program product of claim 14 wherein said code for selecting groups comprises:
- code for analyzing data from said graph of said second degree probability with respect to said first degree probability; and
- code for grouping said events on said graph according to said same first degree probability.

20. The computer program product of claim 14 wherein said code for building comprises:
- code for receiving said triggered event;
- code for determining said group into which said triggered event is grouped;
- code for constructing said user interface to provide said user choices for each of said events contained in said group;
- code for maintaining a database of interface modules; and
- code for relating each of said interface modules with each possible event, wherein said user interface is built using said interface modules related to each of said events contained in said group.

* * * * *